(12) United States Patent
Kratschmer et al.

(10) Patent No.: US 6,753,405 B2
(45) Date of Patent: Jun. 22, 2004

(54) PREPARATION OF COPOLYCARBONATES

(75) Inventors: Silke Kratschmer, Krefeld (DE); Lothar Bunzel, Kempen (DE); Hans Deml, Krefeld (DE)

(73) Assignee: Bayer Aktiengesellschaft, Leverkusen (DE)

(*) Notice: Subject to any disclaimer, the term of this patent is extended or adjusted under 35 U.S.C. 154(b) by 0 days.

(21) Appl. No.: 10/195,082

(22) Filed: Jul. 12, 2002

(65) Prior Publication Data

US 2003/0027971 A1 Feb. 6, 2003

(30) Foreign Application Priority Data

Jul. 16, 2001 (DE) .......................................... 101 34 480

(51) Int. Cl.[7] .............................................. C08G 64/00
(52) U.S. Cl. .................... 528/196; 264/176.1; 264/219; 528/198
(58) Field of Search .............................. 264/176.1, 219; 528/196, 198

(56) References Cited

U.S. PATENT DOCUMENTS

| 5,286,834 A | 2/1994 | Sakashita et al. ............ 528/196 |
| 5,401,826 A | 3/1995 | Sakashita et al. ............ 528/204 |
| 5,470,936 A | 11/1995 | Sakashita et al. ............ 528/196 |
| 5,532,324 A | 7/1996 | Sakashita et al. ............ 525/462 |
| 6,586,556 B2 * | 7/2003 | Kratschmer et al. ........ 528/196 |

FOREIGN PATENT DOCUMENTS

| DE | 196 46 401 | 5/1998 |
| JP | 61-264020 | 11/1986 |
| JP | 62-227927 | 10/1987 |

* cited by examiner

Primary Examiner—Terressa Boykin
(74) Attorney, Agent, or Firm—Joseph C. Gil; Aron Preis

(57) ABSTRACT

A process for the preparation of transparent copolycarbonate is disclosed. The copolycarbonate the molecular structure of which contains more than 35 mole % of units derived from dihydroxydiphenylene is prepared by the melt transesterification process wherein the final temperature of the reaction is reached in less than 40 minutes after reaching the starting temperature.

9 Claims, No Drawings

PREPARATION OF COPOLYCARBONATES

FIELD OF THE INVENTION

The present invention relates to a process for the preparation of polycarbonates and more particularly to transparent copolycarbonates that containing more than 35 mol % structural units derived from dihydroxydiphenylene.

SUMMARY OF THE INVENTION

A process for the preparation of transparent copolycarbonate is disclosed. The copolycarbonate the molecular structure of which contains more than 35 mole % of units derived from dihydroxydiphenylene is prepared by the melt transesterification process wherein the final temperature of the reaction is reached in less than 40 minutes after reaching the starting temperature.

BACKGROUND OF THE INVENTION

Copolycarbonates based on 4,4'-dihydroxydiphenyl and 2,2-bis(4-hydroxyphenyl)propane (bisphenol A) are already known from JP-A 5117382, JP-A 62227927 and JP-A 61264020 and are described in EP-A1 0 544 407, U.S. Pat. Nos. 5,470,938, 5,532,324 and 5,401,826 as being particularly resistant to chemicals, heat-stable and flame retardant, while having, compared with commercially available polycarbonate from pure bisphenol A, the same mechanical properties and transparency.

The preparation of copolycarbonates via the melt transesterification process is also well known. This is also described in EP-A1 0 544 407 or DE-A 196 46 401. However, the incorporation of more than 35 mol % dihydroxydiphenyl has not thus far been demonstrated, and according to our own investigations lead to products that are not transparent. There is no indication at all in the prior art, however, how to avoid this lack of transparency.

The object was therefore to develop a process for the preparation of transparent copolycarbonate having more than 35 mol % of its structural units derived from dihydroxydiphenyl (hereinafter referred to as DOD).

It has now been found, surprisingly, that transparent copolycarbonates with >35 mol % DOD are obtained if they are prepared by the melt transesterification process where the heating-up phase in the medium-viscosity range is limited to a max. of 40 min.

DETAILED DESCRIPTION OF THE INVENTION

The present invention therefore relates to a process for the preparation of transparent copolycarbonates, comprising melt transesterification of a mixture containing 35 to 60 mol %, preferably 40 to 50 mol %, of compounds of the formula (I)

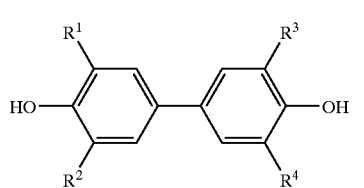

wherein $R^1$ to $R^4$ independently of one another represent H, $C_1-C_4$-alkyl, phenyl, substituted phenyl or halogen, preferably H, $C_1-C_4$-alkyl or halogen, and particularly preferably all represent the same radical, in particular H or tert-butyl, and 65 to 40 mol %, preferably 60 to 50 mol %, of compounds of the formula (II)

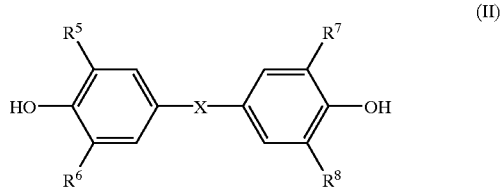

wherein $R^5$ to $R^8$ independently of one another are H, $CH_3$, Cl or Br and X is $C_1-C_5$-alkylene, $C_2-C_5$-alkylidene, $C_5-C_6$-cycloalkylene or $C_5-C_{10}$-cycloalkylidene, as bisphenol monomers, the percents being relative to the total molar amount of (I) and (II). The inventive process is further characterized in that the time span between the starting temperature and reaching the final temperature is less than 40, preferably less than 30 minutes.

The starting temperature of 220 to 240° C., preferably 235° C., is to be understood as meaning that the reaction mixture is first heated up, as is known from the prior art (e.g. DE-A 196 46 401), up to 220 to 240° C., preferably 235° C., during a continuous condensation reaction. In accordance with the invention the mixture must be heated up from the starting temperature within less than 40, preferably less than 30, minutes, to the final temperature of 270 to 330° C., preferably 280 to 320° C., particularly preferably 290 to 300° C., in order to obtain a transparent copolycarbonate.

Preferred compounds of the formula (I) are 4,4'-dihydroxydiphenyl (DOD), 4,4'-dihydroxy-3,3',5,5'-tetra(tert-butyl)diphenyl, 4,4'-dihydroxy-3,3',5,5'-tetra(n-butyl)-diphenyl, 4,4'-dihydroxy-3,3',5,5'-tetra(methyl)diphenyl and 4,4'-dihydroxydiphenyl, and 4,4'-dihydroxy-diphenyl (DOD) is particularly preferred.

Preferred compounds of the formula (II) are 2,2-bis(4-hydroxyphenyl)propane, 1,1-bis(4-hydroxyphenyl)-3,3,5-trimethylcyclohexane (bisphenol TMC) and 1,3-bis[2-(4-hydroxyphenyl)-2-propyl]benzene, 1,1-bis(4-hydroxyphenyl)-1-phenylethane, 1,1-bis(4-hydroxyphenyl)-cyclo-hexane, in particular 2,2-bis(4-hydroxyphenyl) propane (bisphenol A) and 1,1-bis(4-hydroxyphenyl)-3,3,5-trimethylcyclohexane (bisphenol TMC), very particularly preferably 2,2-bis(4-hydroxyphenyl)propane (bisphenol A).

It is possible to use either one compound of the formula (I), to form binary copolycarbonates, or several compounds of the formula (I).

It is also possible to use either one compound of the formula (II), to form binary copolycarbonates, or several compounds of the formula (II).

Diaryl carbonates in the context of the present invention are carbonic acid diesters of the formula (III):

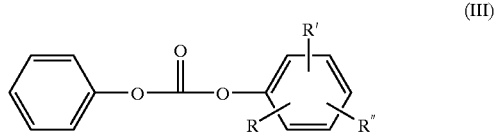

and formula (IV):

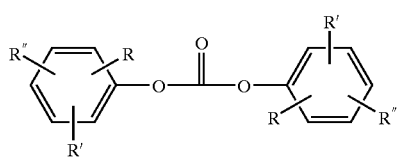

(IV)

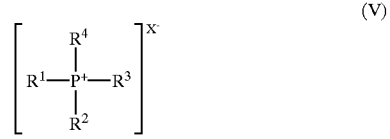

(V)

wherein R, R' and R" independently of one another represent H, optionally branched $C_1$–$C_{34}$-alkyl/cycloalkyl, $C_7$–$C_{34}$-alkaryl or $C_6$–$C_{34}$-aryl, for example diphenyl carbonate, butylphenyl phenyl carbonate, di-butylphenyl carbonate, isobutylphenyl phenyl carbonate, di-isobutylphenyl carbonate, tert-butylphenyl phenyl carbonate, di-tert-butylphenyl carbonate, n-pentylphenyl phenyl carbonate, di-(n-pentylphenyl) carbonate, n-hexylphenyl phenyl carbonate, di(-n-hexylphenyl) carbonate, cyclohexylphenyl phenyl carbonate, di-cyclohexylphenyl carbonate, phenylphenol phenyl carbonate, di-phenylphenol carbonate, isooctylphenyl phenyl carbonate, di-isooctylphenyl carbonate, n-nonylphenyl phenyl carbonate, di-(n-nonylphenyl) carbonate, cumylphenyl phenyl carbonate, di-cumylphenyl carbonate, naphthylphenyl phenyl carbonate, di-naphthylphenyl carbonate, di-tert-butylphenyl phenyl carbonate, di-(di-tert-butylphenyl) carbonate, dicumylphenyl phenyl carbonate, di-(dicumylphenyl) carbonate, 4-phenyoxyphenyl phenyl carbonate, di-(4-phenoxyphenyl) carbonate, 3-pentadecylphenyl phenyl carbonate, di-(3-pentadecylphenyl) carbonate, tritylphenyl phenyl carbonate and di-tritylphenyl carbonate, preferably diphenyl carbonate, tert-butylphenyl phenyl carbonate, di-tert-butylphenyl carbonate, phenylphenol phenyl carbonate, di-phenylphenol carbonate, cumylphenyl phenyl carbonate and di-cumylphenyl carbonate, particularly preferred is diphenyl carbonate.

In addition, the phenolic compounds employed as carbonates may also be used directly as hydroxyaryls, in addition to one of the carbonates mentioned, in order to influence the end group of the polycarbonate. Preferred mixtures are those with diphenyl carbonate. In the process according to the invention, it is possible to add the hydroxyaryl or the hydroxyaryl-carrying compound at any point in time of the reaction, preferably at the start of the reaction, and the addition may be divided into several portions. The content of free hydroxyaryl may be 0.4–17 mol %, preferably 1.3–8.6 mol % (based on the dihydroxy compound). The addition here may take place either before the reaction or entirely or partly during the reaction.

The carbonic acid diesters and the dihydroxy compounds are used in a ratio of 1 to 1–1.1, preferably 1:1.0–1.07, particularly preferably 1:1.02–1.06. Mixtures of the above mentioned carbonic acid diesters may also be employed.

Ammonium or phosphonium compounds, subsequently also in common called onium salts, may be employed as catalysts for the synthesis. They are preferably employed in amounts of 0.0001 to 0.01 mol %, based on the total of dihydroxy compounds, particularly preferably in amounts of 0.002 to 0.006 mol %.

Phosphonium salts, optionally in combination with other suitable catalysts which do not lead to an increased intrinsic color, are preferably used as the catalyst for the preparation of the copolycarbonates according to the invention.

Phosphonium salts in the context of the invention are those of the formula (V):

wherein $R^{1-4}$ may be the same or different $C_1$–$C_{10}$-alkyls, $C_6$–$C_{10}$-aryls, $C_7$–$C_{10}$-aralkyls or $C_5$–$C_6$-cycloalkyls, preferably methyl or $C_6$–$C_{14}$-aryls, particularly preferably methyl or phenyl, and X may be an anion, such as hydroxide, sulfate, hydrogen sulfate, bicarbonate, carbonate, a halide, preferably chloride, or an alcoholate of the formula OR, wherein R may be $C_6$–$C_{14}$-aryl or $C_7$–$C_{12}$-aralkyl, preferably phenyl.

Preferred catalysts are tetraphenylphosphonium chloride, tetraphenylphosphonium hydroxide and tetraphenylphosphonium phenolate, particularly preferably tetraphenylphosphonium phenolate.

The copolycarbonates may be branched in a controlled manner and may therefore contain small amounts of 0.02 to 5 mol % (based on the sum of dicarboxylic acid and dihydroxy compound) of branching agents. Suitable branching agents are the compounds which are suitable for polycarbonate preparation and have three or more functional groups, preferably those with three or more than three phenolic OH groups, for example 1,1,1-tri-(4-hydroxyphenyl)ethane and isatin-biscresol.

The educts and catalysts of the formula (I) to (V) are generally known and for the most part are commercially obtainable or obtainable by known methods. The preparation of bisphenols is described generally in EP-A 720 976 and the preparation of 4,4'-dihydroxydiphenyl is mentioned e.g. in JP 61200935.

All the raw materials may of course contain impurities resulting from the synthesis. However, a high purity is desirable and is to be aimed for, and these educts are therefore employed with the highest possible purity.

The copolycarbonates according to the invention may have molecular weights of between Mw (weight-average molecular weight) 10,000 to 60,000, preferably Mw 20,000 to 55,000, determined by measurement of the relative solution viscosity in methylene chloride or in mixtures of equal amounts by weight of phenol/o-dichlorobenzene, calibrated by light scattering, as described in Hans-Georg Elias, Makromoleküle, Hüthig & Wepf Verlag, Basle, New York 1990, 5th ed., p. 85–93.

The polycarbonates according to the invention may be processed as thermoplastics in the conventional manner at temperatures of 240° C. to 380° C., preferably 260° C. to 360° C. Any desired shaped articles and films may be produced in a known manner by injection moulding or via extrusion.

The polycarbonates according to the invention are readily soluble in solvents, such as chlorinated hydrocarbons, e.g. methylene chloride, and may thus be processed to cast films in the known manner.

In particular, films may be produced from the high molecular weight aromatic polycarbonates of the invention. The films have preferred thicknesses of between 1 and 1,500 μm, in particular preferred thicknesses of between 10 and 900 μm.

The films obtained may be stretched monoaxially or biaxially, preferably in a ratio of 1:1.5 to 1:5, in a manner known per se.

The films may be produced by the known processes for film production, e.g. by extrusion of a polymer melt through a slit dye, by blowing on a film-blowing machine, by thermoforming or by casting. It is possible here for the films to be used by themselves. However, it is of course also possible to produce composite films with other films of plastic by the conventional processes, all known films in principle being possible as partners, depending on the desired use and the final property of the composition films. A composite may be produced from two or more films.

In addition, the copolycarbonates according to the invention may also be used in other layer systems, such as e.g. in coextruded sheets.

Auxiliary substances and reinforcing substances may be admixed to the copolycarbonates according to the invention to modify the properties. Such substances which are to be considered possible are, inter alia: heat and UV stabilizers, flow auxiliaries, mould release agents, flame-proofing agents, pigments, finely divided minerals and fibrous substances, e.g. alkyl and aryl phosphites, phosphates and -phosphanes, low molecular weight carboxylic acid esters, halogen compounds, salts, chalk, quartz flour, glass and carbon fibres, pigments and a combination thereof. Such compounds are described e.g. in WO 99/55772, p. 15–25 and in "Plastics Additives", R. Gächter and H. Müller, Hanser Publishers 1983.

Other polymers, e.g. polyolefins, polyurethanes, polyesters, acrylonitrile/butadiene/styrene and polystyrene, may furthermore also be admixed to the copolycarbonates according to the invention.

These substances are preferably added to the finished polycarbonate on conventional units, but they may also be added at another stage of the preparation process, depending on requirements.

The polycarbonates obtainable by the process according to the invention may be processed in the conventional manner to any desired shaped articles, for example to films or sheets, on conventional machines, for example on extruders or injection moulding machines.

The present invention also additionally provides the use of the polycarbonates according to the invention and of the corresponding moulding compositions for the production of shaped articles and extrudates, in particular optical articles, films and sheets, and the corresponding shaped articles, preferably optical articles, produced from the polycarbonates according to the invention.

The combination of properties, such as heat resistance and resistance to chemicals, allows wide use of the copolymers according to the invention. Possible uses of the polycarbonates according to the invention are, without intending to limit them, 1. Safety panes, which are known to be necessary in many areas of buildings, vehicles and aircraft, and as shields on helmets.
2. Production of foils, in particular ski foils.
3. Production of blown articles (see, for example, U.S. Pat. No. 2,964,794), for example 1 to 5 gallon water bottles.
4. Production of transparent sheets, in particular cavity sheets, for example for covering buildings, such as railway stations, greenhouses and lighting plants.
5. Production of optical data storage units.
6. For production of traffic-light housings or traffic signs.
7. For production of foams, (see, for example, DE-AS 1 031 507).
8. For production of threads and wires (see, for example, DE-AS 1 137 167 and DE-OS 1 785 137).
9. As translucent plastics with a content of glass fibres for lighting purposes (see, for example, DE-OS 1 554 020).
10. As translucent plastics with a content of barium sulfate, titanium dioxide and/or zirconium oxide or organic polymeric acrylate rubbers (EP 634 445, EP 269 324) for the production of transparent and light-scattering mouldings.
11. For production of precision injection moulding components, such as, for example, lens holders. Polycarbonates with a content of glass fibres, which optionally additionally comprise about 1–10 wt. % $MoS_2$, based on the total weight, are used for this.
12. For production of optical apparatus components, in particular lenses for photographic and film cameras (see, for example, DE-OS 2 701 173).
13. As light transmission carriers, in particular as light conductor cable (see, for example, EP-A1 0 089 801).
14. As electrical insulating materials for electrical conductors and for plug shells and plug-in connectors.
15. Production of mobile telephone casings with improved resistance to perfume, shaving lotion and skin perspiration.
16. Network interface devices.
17. As a carrier material for organic photoconductors.
18. For production of lamps, e.g. searchlights, as so-called "head-lamps" or scattered light panes or internal lenses.
19. For medical uses, e.g. oxygenators, dialysers.
20. For foodstuffs uses, such as e.g. bottles, utensils and chocolate moulds.
21. For uses in the car sector where contact with fuels and lubricants may occur, such as, for example, bumpers, optionally in the form of suitable blends with ABS or suitable rubbers.
22. For sports articles, such as e.g. slalom poles or ski boot buckles.
23. For domestic articles, such as e.g. kitchen sinks and letterbox housings.
24. For housings, such as e.g. electrical distribution cabinets.
25. Casings for electric toothbrushes and hair dryer casings.
26. Transparent washing machines—portholes with improved resistance to the wash solution.
27. Safety glasses, optical correction glasses.
28. Lamp covers for kitchen equipment with improved resistance to kitchen vapour, in particular oil vapours.
29. Packaging film for medicaments.
30. Chip boxes and chip supports.
31. For other uses, such as e.g. fattening stable doors or animal cages.

The following examples are intended to illustrate the present invention, but without limiting it:

EXAMPLES

The relative solution viscosity was determined in methylene chloride at a concentration of 5 g/l at 25° C., calibrated by light scattering.

The content of phenolic OH is obtained by IR measurement. For this purpose, the difference between a solution of 2 g polymer in 50 ml methylene chloride and pure methylene chloride is measured and the difference in extinction at 3,582 $cm^{-1}$ is determined.

Example 1

27.40 g (0.12 mol) bisphenol A, 14.88 g (0.08 mol) 4,4'-dihydroxydiphenyl, 44.99 g (0.21 mol) diphenyl carbonate and 4.9 mg ($8 \cdot 10^{-6}$ mol) tetraphenylphosphonium phenolate (metered in as a mixed crystal with 30 wt. % phenol, based on the mixed crystal) are weighed into a 500 ml three-necked flask with a stirrer, internal thermometer and Vigreux column (30 cm, mirrored) with a bridge. The apparatus is freed from atmospheric oxygen by applying a vacuum and purging with nitrogen (three times) and the mixture is melted at 150° C. The temperature is increased to 190° C. and the phenol formed is distilled off over a period of 30 minutes, the vacuum is then adjusted to 100 bar and the mixture is stirred for 20 minutes. The temperature is now increased to 235° C., after 15 minutes the vacuum is increased to 60 mbar and after a further 15 minutes the temperature is adjusted to 270° C. After another 15 minutes the vacuum is increased to 5 mbar, and 15 minutes later the temperature is increased to 280° C. After 15 minutes, 0.5 mbar is applied and the mixture is stirred for 15 minutes, and stirred for 30 minutes at 300° C. The results are summarized in table 1.

Example 2

26,94 g (0.118 mol) bisphenol A, 15.25 g (0.082 mol) 4,4'-dihydroxydiphenyl, 46.70 g (0.22 mol) diphenyl carbonate and 69 µl of a 5% solution of tetraphenylphosphonium phenolate in phenol/water 9:1 are weighed into a 500 ml three-necked flask with a stirrer, internal thermometer and Vigreux column (30 cm, mirrored) with a bridge. The apparatus is freed from atmospheric oxygen by applying a vacuum and purging with nitrogen (three times) and the mixture is melted at 1 50° C. The vacuum is adjusted to 100 mbar, the temperature is increased to 190° C. and the phenol formed is distilled off over a period of 30 minutes. The temperature is now increased to 235° C., and after 15 minutes the temperature is adjusted to 300° C. in the course of 10 minutes. The vacuum is now improved stepwise to 0.5 mbar, as soon as the distillation subsides. The mixture is then stirred for 30 minutes at 300° C. The results are summarized in table 1.

Example 3

62.78 g (0.28 mol) bisphenol A, 41.85 g (0.23 mol) 4,4'-dihydroxydiphenyl, 110.32 g (0.52 mol) diphenyl carbonate and 12.3 mg ($2 \cdot 10^{-5}$ mol) tetraphenylphosphonium phenolate (is metered in as a mixed crystal with 30 wt. % phenol, based on the mixed crystal) are weighed into a 500 ml three-necked flask with a stirrer, internal thermometer and Vigreux column (30 cm, mirrored) with a bridge. The apparatus is freed from atmospheric oxygen by applying a vacuum and purging with nitrogen (three times) and the mixture is melted at 150° C. The vacuum is adjusted to 100 mbar, the temperature is increased to 190° C. and the phenol formed is distilled off over a period of 60 minutes. The temperature is now increased to 235° C., and after 30 minutes the temperature is adjusted to 300° C. The vacuum is now improved stepwise to 0.5 mbar, as soon as the distillation subsides. The mixture is then stirred for 30 minutes at 300° C. The results are summarized in table 1.

Example 4

As example 3, but 57.07 g (0.25 mol) bisphenol A, 46.50 g (0.25 mol) 4,4'-dihydroxydiphenyl, 112.47 g (0.53 mol) diphenyl carbonate and 12.3 mg ($2 \cdot 10^{-5}$ mol) tetraphenylphosphonium phenolate (is metered in as a mixed crystal with 30 wt. % phenol, based on the mixed crystal) are weighed into the flask. The results are summarized in table 1.

Comparison Example 1

627.810 g (2.75 mol) bisphenol A, 418.50 g (2.25 mol) 4,4'-dihydroxydiphenyl, 1,103.23 g (5.16 mol) diphenyl carbonate and 0.123 g ($2 \cdot 10^{-4}$ mol) tetraphenylphosphonium phenolate (is metered in as a mixed crystal with 30 wt. % phenol, based on the mixed crystal) are weighed into a stirred container. The container is freed from atmospheric oxygen by applying a vacuum and purging with nitrogen (three times) and the mixture is melted at 150° C. under 100 mbar. The temperature is increased to 190° C. and the phenol formed is distilled off over a period of 45 minutes. The temperature is now increased to 330° C. in the course of 45 minutes. The vacuum is now improved stepwise to 0.5 mbar, as soon as the distillation subsides. The mixture is then stirred for 30 minutes at a temperature of 330° C. The results are summarized in table 1.

Comparison Example 2

22.83 g (0.1 mol) bisphenol A, 18.60 g (0.1 mol) 4,4'-dihydroxydiphenyl, 44.99 g (0.21 mol) diphenyl carbonate and 4.9 mg ($8 \cdot 10^{-6}$ mol) tetraphenylphosphonium phenolate (is metered in as a mixed crystal with 30 wt. % phenol, based on the mixed crystal) are weighed into a 500 ml three-necked flask with a stirrer, internal thermometer and Vigreux column (30 cm, mirrored) with a bridge. The apparatus if freed from atmospheric oxygen by applying a vacuum and flushing with nitrogen (three times) and the mixture is melted at 150° C. The vacuum is adjusted to 100 mbar, the temperature is increased to 190° C. and the phenol formed is distilled off over a period of 20 minutes. The temperature is now increased to 235° C., and after 15 minutes the vacuum is adjusted to 60 mbar and the mixture is stirred for 15 minutes. It is now heated to 270° C., and after 15 minutes the vacuum is increased slowly to 5 mbar. After a further 15 minutes, the temperature is adjusted to 300° C. in the course of 10 minutes. After 15 minutes, the vacuum is improved to 0.5 mbar. The temperature is then set at 320° C., after 15 minutes, and the mixture is stirred for 30 minutes. The results are summarised in table 1.

TABLE 1

Comparison of the copolycarbonates

| No. | Content BPA:DOD | Relative solution viscosity | Transparency |
|---|---|---|---|
| Ex. 1 | 60:40 | 1.316 | transparent |
| Ex. 2 | 59:41 | 1.309 | transparent |
| Ex. 3 | 55:45 | 1.388 | transparent |
| Ex. 4 | 50:50 | 1.336 | transparent |
| comp. ex. 1 | 55:45 | 1.238 | non-transparent |
| comp. ex. 2 | 50:50 | insoluble | non-transparent |

BPA: Bisphenol A
DOD: 4,4'-dihydroxydiphenyl

These results show the surprising superiority of the claimed process in view of the known methods.

In comparative example 1 it is not possible, even with a higher end temperature, to achieve a transparent material with a good viscosity (resp. Molecular mass) as it is possible according to examples 1 to 4.

Comparative example 2 does only yield an insoluble, and therefore usually non-thermoplastic, intransparent material. Therefore the presently claimed subject matter is new and inventive.

Although the invention has been described in detail in the foregoing for the purpose of illustration, it is to be understood that such detail is solely for that purpose and that variations may be made therein by those skilled in the art without departing from the spirit and scope of the invention except as it may be limited by the claims.

What is claimed is:

1. A process for the preparation of a copolycarbonate comprising transesterifying in the melt at least one diaryl carbonate with a mixture containing
35 to 60 mol % of compounds of the formula (I):

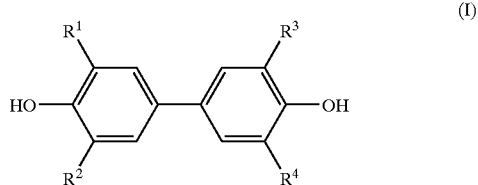

wherein $R^1$ to $R^4$ independently of one another represent H, $C_1$–$C_4$-alkyl, phenyl, substituted phenyl or halogen, and
65 to 40 mol %, of compounds of the formula (II):

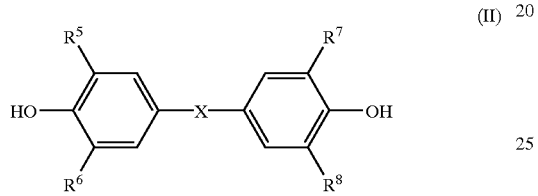

wherein $R^5$ to $R^8$ independently of one another are H, $CH_3$, Cl or Br and X is $C_1$–$C_5$-alkylene, $C_2$–$C_5$-alkylidene, $C_5$–$C_6$-cycloalkylene or $C_5$–$C_{10}$-cycloalkylidene,
said %, both occurrences being relative to the total molar amount of (I) and (II), characterized in that a final temperature of 270 to 330° C. is reached within less than 40 minutes after the starting temperature of 220 to 240° C.

2. The process of claim 1 wherein the transesterifying is in the presence of onium salt catalyst.

3. The process of claim 1 wherein the transesterification is in the presence of tetraphenylphosphonium phenolate catalyst.

4. The process of claim 2 wherein catalyst is present in an amount of $10^{-3}$ to $10^{-8}$ mol % based on the total molar amount of bisphenol.

5. A transparent copolycarbonate resin having 35 to 60 mol % of its structural units derived from dihydroxy compounds of the formula (I):

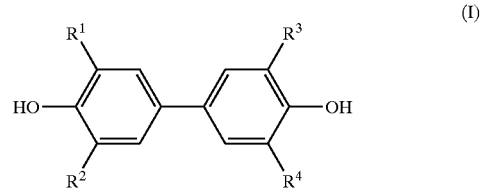

wherein $R^1$ to $R^4$ independently of one another represent H, $C_1$–$C_4$-alkyl, phenyl, substituted phenyl or halogen and 65 to 40 mol % of its structural units derived from compounds of the formula (II):

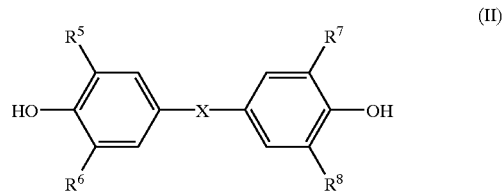

wherein $R^5$ to $R^8$ independently of one another are H, $CH_3$, Cl or Br and X is $C_1$–$C_5$-alkylene, $C_2$–$C_5$-alkylidene, $C_5$–$C_6$-cycloalyylene or $C_5$–$C_{10}$-cycloalkylidene, said %, both occurrences being relative to the total molar amount of (I) and (II).

6. A thermoplastic molding composition comprising the copolycarbonate of claim 5.

7. A molded article comprising the composition of claim 6.

8. The copolycarbonate of claim 5 wherein the dihydroxy compound of formula (I) is 4,4'-dihydroxydiphenyl and wherein the compound of formula (II) is bisphenol A.

9. An extruded article comprising the copolycarbonate of claim 5.

* * * * *